April 17, 1956
V. C. FUSCO
2,742,517
SELECTIVE REMOVAL OF ACETYLENE FROM
ACETYLENE-ETHYLENE MIXTURES
Filed June 19, 1952
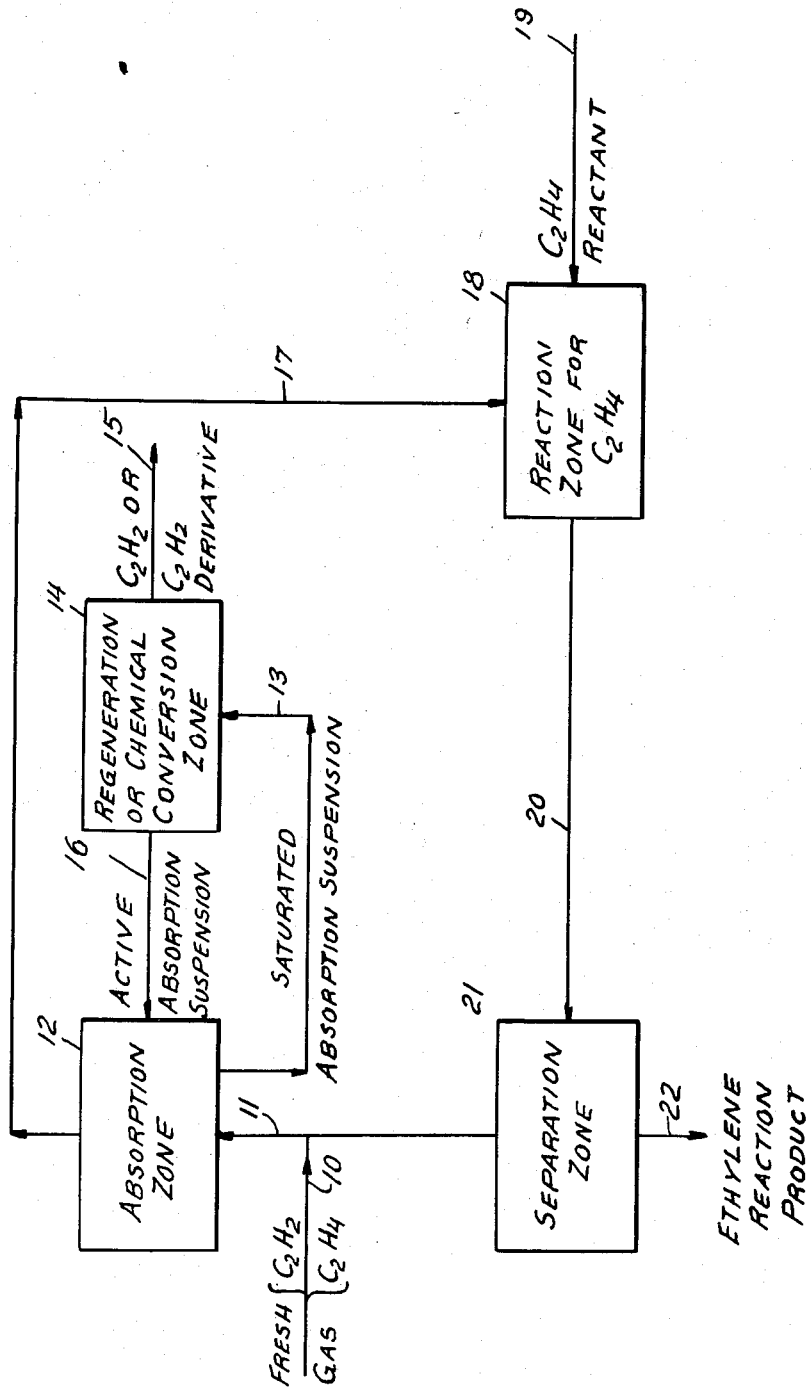
INVENTOR
VICTOR C. FUSCO
BY
Adams, Forward and McLean
ATTORNEYS

United States Patent Office 2,742,517
Patented Apr. 17, 1956

2,742,517

SELECTIVE REMOVAL OF ACETYLENE FROM ACETYLENE-ETHYLENE MIXTURES

Victor C. Fusco, Baltimore, Md., assignor to Olin Mathieson Chemical Corporation, a corporation of Virginia Application June 19, 1952, Serial No. 294,395

1 Claim. (Cl. 260—677)

This invention relates to the utilization of acetylene-ethylene mixtures such as those obtained by the cracking of relatively saturated hydrocarbons. More particularly, it relates to selective removal of acetylene from an acetylene-ethylene mixture by absorptive contact with a suspension of an alkali metal hydroxide, particularly potassium hydroxide, in a non-aqueous organic solvent.

The production of mixed unsaturated gases by the drastic cracking or dehydrogenation of relatively saturated charge stocks, particularly ethane, ethane-propane mixtures and heavier hydrocarbons is well known. Various processes are available for the production of such unsaturated mixtures comprising various proportions of acetylene, ethylene and hydrogen with minor amounts of other products as impurities.

By so-called "shallow" cracking, about 30-35% of unsaturates may be obtained in the resulting gas and the yields of acetylene and ethylene total about 70-75%. Where ethylene is the product principally desired, the dehydrogenation conditions may be controlled so as to produce the maximum yield of ethylene and the minimum production of acetylene. Selective hydrogenation of the acetylene to ethylene can be used to produce a gas fairly readily separable into an ethylene component free of acetylene and other contaminants. In spite of the waste of the acetylene produced, much ethylene has been prepared by this process.

Where acetylene is the primary product desired, the cracking must be extremely severe. Such operations, usually termed "deep" cracking, in general require rapid heating combined with quick quenching to produce satisfactory yields and conversions. Yields of only about 50-55% of acetylene in concentrations of 15-17% in the gas are obtained. Ethylene is usually absent. The conditions for deep cracking provided, for example, by the use of regenerative furnaces are so severe that even the best of modern refractories have a relatively short life. Extensive purification operations are necessary to separate acetylene from the cracked gases. To obtain pure acetylene, the industry has alternatively turned to the calcium carbide method of generation. The cost of acetylene by the latter method is about the same as by cracking hydrocarbons, taking into account the expensive purification required following the cracking process.

Thus acetylene and ethylene are obtainable as chemical individuals by cracking saturated hydrocarbons, but each requires separation and purification steps largely nullifying the economic advantage of low raw-materials cost. Although the unsaturates may be separated readily from hydrogen, methane and the heavier ends in such mixtures, by well known means, for example, adsorption and desorption, and thus acetylene-ethylene mixtures relatively free of other constituents may be produced, the further separation of acetylene from ethylene by physical methods, for example, distillation under pressure or by the use of selective solvents is too expensive to be economically feasible. Hence, utilization of the low cost shallow cracking process for producing mixtures of acetylene and ethylene which has a theoretically tremendous economic advantage over the deep cracking processes is not feasible because of the difficulty and expense of physically separating the two unsaturates.

My invention provides a system for direct utilization of the mixed acetylene and ethylene fractions derived from cracking operations by selective removal of acetylene by means of chemical absorption. The acetylene-ethylene mixture is passed through an absorption zone in absorptive contact with an absorbent suspension comprising potassium hydroxide in finely divided form in an inert non-aqueous organic liquid. The absorption suspension may contain substantial proportions of sodium hydroxide admixed with the potassium hydroxide. Water must be excluded from the system and for this purpose the suspension may be treated with a strong dehydrating material such as metallic sodium. The suspended hydroxide should be in finely divided form. A temperature of about 70° to 100° C. is maintained within the absorption zone. Under these conditions, I have found that selective absorption of acetylene occurs and that the ethylene passes through the system unchanged. The saturated absorbent suspension is continuously or periodically withdrawn from the system and is treated in a separate reaction zone for regeneration of the absorbent suspension and release of substantially pure acetylene gas by heating or for conversion of the acetylene in situ to a reaction product by contact to an appropriate reagent. The residual gas stream enriched in ethylene from the absorption zone now can be advantageously utilized in ethylene reaction. Although the acetylene content can be reduced to a very low level by control within the absorption system or by application of repeated absorptive contacting, it is advantageous to combine the selective absorptive step with a selective reaction for ethylene in the presence of acetylene by operating the selective absorption step under conditions of optimum rather than maximum absorption and thus recovering a residual gas enriched in ethylene but containing some acetylene for utilization by selective ethylene reaction.

The feed gas in the present invention may comprise a major proportion of acetylene or ethylene and the cracking operation may be controlled to produce these components in the proportions desired for the chemical conversion. Suitable gas mixtures for use according to the present invention may be obtained by cracking saturated hydrocarbons or mixtures of saturated hydrocarbons at temperatures between about 1100° and 1600° C. or higher using short contact times. Cracking conditions are controlled to yield a product containing acetylene and ethylene in any desired proportion but preferably in about equimolar quantities. Usually substantially all of the saturates are cracked in one pass.

The hydrocarbon starting material may comprise normally gaseous and/or normally liquid saturated hydrocarbons from any suitable source, for example, natural gas, casinghead gasoline, natural gasoline, naphtha fractions or even higher boiling hydrocarbon fractions. Preferably, however, a relatively pure ethane fraction is used as charge stock. Cracking ethane under shallow cracking conditions produces a particularly desirable product mixture comprising largely ethylene, acetylene and hydrogen uncontaminated by other olefins or unsaturated hydrocarbons. In contrast, using propane or propane-containing fractions as feed stock, considerable proportion of propylene may be present in the gas. However such unsaturated mixtures containing propylene, for example, may be used in the process of the present invention when the residual mixed olefins from the first stage are converted, for example, to mixed chlorohydrins and thence to oxides. The latter are readily separable by distillation or may be utilized for the preparation of mixed glycols or other reaction products. Alternatively, propylene is readily separable from ethylene by absorption in sulfuric acid of appropriate concentration.

Deep cracking of charge stocks containing appreciable amounts of propane and higher hydrocarbons produces mixtures substantially free of higher molecular weight unsaturates and thus may be used to produce suitable unsaturated gas mixtures for use according to the present invention.

In the cracking operation any suitable cracking reactor enabling the thermal conversion of hydrocarbons may be employed. Tubular furnaces may be used for the shallow cracking of ethane but particularly for the cracking of higher saturated hydrocarbons, regenerative type furnaces or pebble furnaces may be used. In the former the hydrocarbons are passed through narrow elongated passages defined by non-catalytic refractory material of high heat conductivity, for example, silicon carbide. In pebble furnaces the hydrocarbons are passed through beds of pebbles or fragments of refractory material maintained at cracking temperatures by the combustion of waste gas in a separate zone. The conditions necessary comprise the use of temperatures within the range of about 1100° to 1600° C. and preferably from about 1200° to 1350° C. Atmospheric or subatmospheric pressure may be maintained within the cracking zone. Contact times do not usually exceed 25 seconds and preferably are not more than about 15 seconds. Suitable quenching means are used to restrict the reaction periods. Steam or other inert gas may be added to the hydrocarbon charged to provide conditions suitable for the conversion to mixtures of acetylene and ethylene. The relative proportions of these two components in the cracked product may be controlled by varying the cracking conditions within the above defined limits. Usually an increase in temperature and an increase in contact time within these ranges serves to increase the proportion of acetylene. The effluent gas from the cracking unit is suitably separated, for example, by adsorption and desorption into a hydrogen-saturated hydrocarbon fraction, an acetylene-ethylene fraction and a fraction of higher boiling components.

In the absorption of acetylene from the mixture of unsaturates by potassium hydroxide, the latter is advantageously suspended in a finely divided condition in a non-aqueous inert organic liquid. Mixtures of sodium and potassium hydroxides, particularly compositions approximating the eutectic mixtures of about 51% of NaOH and 49% of KOH, melting at 187° C. are useful. Suitable suspensions may be prepared mechanically or, more easily, by melting potassium hydroxide in an inert organic liquid having a sufficiently high boiling point and stirring vigorously while cooling. The organic liquids should have a boiling point at atmospheric pressure of at least about 120° C. and preferably of about 130–150° C. although it may boil as high as 200° C. or more. The liquid should be inert to potassium hydroxide, acetylene and potassium acetylide which may be formed. Glycol ethers, acetals and hydrocarbons are particular examples of useful solvents. More particularly, 1,2-dibutoxyethane, acetaldehyde dibutylacetal, butyraldehyde diethyl acetal, xylene, trichlorobenzenes are suitable.

As noted above, a suspension of potassium hydroxide may be formed in these solvents by heating to 110–150° C. and stirring while cooling to about 70–100° C. At the latter temperature level, absorption of acetylene is rapid. The pressure may be approximately atmospheric to moderate, say 25 p. s. i. a. Acetylene may be desorbed by reheating the suspension to 110–150° C. at which temperatures substantially all the acetylene may be recovered and the suspension cooled as before to regenerate the absorbing suspension. Alternatively the acetylide solution may be utilized for various reactions of acetylene which are effected in the presence of strong alkalies. For example, the absorbent suspension may be treated to separate acetylene and form acetylenic alcohols by adding a carbonyl compound, i. e. an aldehyde or ketone, to the cooled acetylide solution. Formaldehyde yields propargyl alcohol and 1,4-butynediol; acetone yields 2-methyl-3-butyn-2-ol and acetaldehyde yields 3-butyn-2-ol. Alcohols yield vinyl ethers, e. g. n-butanol forms vinyl n-butyl ether. Thus acetylene may be absorbed in a xylene suspension of potassium hydroxide. Acetone is added slowly at a temperature of −10° C., continuing the passage of the acetylene containing gas. When the addition is complete, water may be added to cause the separation of the major proportion of the 2-methyl-3-butyn-2-ol. Additional quantities may be extracted from the aqueous layer.

The absorbent suspension may be continuously or intermittently withdrawn from the system and heated to regenerate substantially pure acetylene, returning the suspension cooled to absorbing temperatures to the absorption step. Alternatively fresh potassium hydroxide suspension may be added at one point of the absorption system while withdrawing at another point a portion of the acetylide solution for chemical utilization, e. g., by reaction with alcohols or carbonyl compounds.

More complete utilization of the acetylene-ethylene mixtures desired from the cracking operation is advantageously provided by reacting the residual gas enriched in ethylene separated from the absorption step in a second stage with a selective ethylene consuming reagent to produce reaction products of the ethylene without substantial reaction of the acetylene. The residual ethylene may be converted by any one of the following several suitable treatments:

1. Ethylene chlorohydrin may be prepared in good yields and with good conversions as described in pending application Serial No. 292,955, filed June 11, 1952, of Bruno H. Wojcik by introducing the gas mixture in an appropriate manner with chlorine into an aqueous reaction system under chlorohydrination conditions to convert the ethylene to ethylene chlorohydrin. Surprisingly, the aceylene contained in the gas passes through the chlorohydrination reaction without any change and may subsequently be recycled to the first stage.

2. By liquid-phase chlorination in a chlorohydrocarbon solvent, particularly in the presence of iron or iron chloride catalysts, as described in pending application Serial No. 293,581, filed June 14, 1952, of Victor C. Fusco, ethylene is converted to ethylene dichloride while acetylene is substantially unaffected.

3. The residual ethylene may also be converted to ethyl chloride by admixture with hydrogen chloride and passage over a catalyst as described in pending application Serial No. 292,847, filed June 11, 1952, of Ernest H. Millard, Jr. For example, hydrogen chloride in sufficient quantity to be stoichiometrically equivalent to the ethylene present in the charge gas is passed over a zinc chloride-impregnated activated carbon catalyst at about 160° C. to convert ethylene to ethyl chloride and minor proportions of acetylene to vinyl chloride. Surprisingly, under these conditions acetylene is converted only in relatively minor proportions. Vinyl chloride and ethyl chloride are separated by refrigeration from the gas stream and fractionated. The stripped gas may be recycled to the first or acetylene-separating step of the present process.

4. Styrene may be prepared from the ethylene-rich residue gas from the first stage particularly when multiple passes have materially reduced the acetylene content by passing it together with benzene over suitable catalysts in the vapor phase. For example, a mixture of about 3 to 6 moles of benzene per mole of ethylene in the residue gas is introduced at a pressure of 20 to 60 p. s. i. over a catalyst consisting of phosphoric acid on kieselguhr at a temperature of about 275° C. The resulting ethyl benzene is separated, fractionated and thermally or catalytically dehydrogenated to form styrene. For large scale operations, a cyclic procedure of operation is advantageous in which the level of conversion in each reaction zone is limited in a manner balancing the consumption of acetylene and ethylene consumed in their respective reaction zones. An ultimate tail gas suitable in proportions of acetylene and ethylene for recycle under steady stable conditions is thereby provided.

My invention will be further described by reference to the accompanying drawing in which a simplified flow diagram of my invention is shown. The charge gas mixture, e. g. a mixture of unsaturates approximating equimolar proportions of acetylene and ethylene derived from ethane cracking for example, is introduced to the system as indicated by line 10 and together with recycle gas in line 11 is charged to acetylene reaction zone 12. In reaction zone 12, the charge gas mixture is contacted with an absorption suspension comprising finely divided potassium hydroxide in an organic solvent such as xylene. The absorption suspension following contact with the charge mixture is circulated as indicated by line 13 to a regeneration or chemical conversion zone 14. In zone 14, the absorption suspension may be regenerated by desorption of acetylene at a temperature of 120° to 150° C. Thus acetylene may be recovered as a product, or the absorption suspension may be utilized in chemical reaction to convert the acetylide to an acetylene derivative recovered as indicated by line 15. The reactivated absorption suspension is recirculated to reaction zone 12 as indicated by line 16. The residual gas stream from reaction zone 12 then may be circulated as indicated by line 17 to ethylene reaction zone 18, to which a reactant selective for ethylene is introduced as indicated by line 19. The effluent reaction mixture is passed as indicated by line 20 to a separation zone 21. In the operations of the separation zone, the ethylene reaction product is recovered as indicated by line 22 and residual unreacted gas may be separated for recycle through line 11.

The following examples are illustrative of test results obtained applying the selective adsorption procedure of my invention.

*Example I*

A gas mixture of acetylene and ethylene was passed through a suspension of potassium hydroxide in xylene. The reagent solution was prepared by heating 350 grams of C. P. potassium hydroxide in one liter of technical xylene with stirring until the xylene refluxed. Ten milliliters of aniline and 3.7 grams of sodium were added as conditioning agents. On cooling to 80° C. with vigorous stirring the potassium hydroxide was very finely dispersed. The gas mixture comprising 1.41 moles of acetylene and 1.59 moles of ethylene was passed through the suspension at 76–80° C. using a space velocity of 30 hrs.$^{-1}$. About 44% of the acetylene charged was absorbed, producing an exit gas of 0.79 mole of acetylene and 1.54 moles of ethylene. Substantially pure acetylene may be recovered by heating the absorbent solution, or formaldehyde may be added to the acetylene solution to obtain 1,4-butynediol. The residual gas mixture is suitable for conversion of ethylene to ethylene chlorohydrin as described in the Wojcik application Serial No. 292,955, filed June 11, 1952.

*Example II*

A gas mixture of 0.44 mole of acetylene and 0.51 mole of ethylene was passed through a suspension of potassium hydroxide in xylene prepared as described in Example I. The temperature was 81–87° C. and the space velocity was 29 hrs.$^{-1}$. The exit gas contained 0.23 mole of acetylene and 0.49 mole of ethylene showing the absorption of 48% of the acetylene charged. The exit gas enriched in ethylene may be repeatedly extracted in similar stages to reduce the acetylene content further. Acetylene, substantially free from ethylene, may be regenerated from the suspension by heating to about 120° C.

I claim:

In the utilization of mixtures of acetylene and ethylene without pre-separation thereof, the process which comprises passing the acetylene and ethylene mixture through an absorption zone in absorptive contact with an absorbent suspension comprising finely divided potassium hydroxide suspended in an inert non-aqueous organic liquid at about 70° to 100° C., said inert non-aqueous organic liquid having a boiling point of at least about 120° F., withdrawing a residual gas stream enriched in ethylene, withdrawing absorbent suspension enriched in acetylene, heating the absorbent suspension to about 110 to 150° C. to separate acetylene therefrom and passing the residual gas stream enriched in ethylene through a reaction zone in which it is reacted with a selective ethylene-consuming reagent, recovering the ethylene reaction product from the resulting reaction mixture, controlling the extent of acetylene and ethylene removal in said absorption and reaction zones so as to produce an ultimate residual gas stream suitable in proportions of acetylene and ethylene for recycle with fresh feed to the absorption zone to maintain substantially stable conditions in the system.

References Cited in the file of this patent

UNITED STATES PATENTS

| | | |
|---|---|---|
| 1,900,655 | Metzger | Mar. 7, 1933 |
| 2,238,490 | Hasche | Apr. 15, 1941 |
| 2,435,524 | Weizmann | Feb. 3, 1948 |

OTHER REFERENCES

Bergmann, "The Chemistry of Acetylene and Related Compounds," pages 50, 53, 54 and 56 (1948); Interscience Publishers Inc., N. Y.